Dec. 29, 1964   J. J. CHRISTENSEN   3,163,230
HORSE SHOE

Filed Jan. 25, 1962   2 Sheets-Sheet 1

INVENTOR.
JENS JUUL CHRISTENSEN
BY
ATTORNEYS

Dec. 29, 1964 J. J. CHRISTENSEN 3,163,230
HORSE SHOE
Filed Jan. 25, 1962 2 Sheets-Sheet 2

INVENTOR.
JENS JUUL CHRISTENSEN
BY
ATTORNEYS

3,163,230
HORSE SHOE
Jens Juul Christensen, 350 Grand Blvd., Bedford, Ohio
Filed Jan. 25, 1962, Ser. No. 168,630
8 Claims. (Cl. 168—22)

My invention relates to shoes for horses and the like.

An object of my invention is to provide an improved shoe applied to the hoof without nails or similar means which penetrate the wall of the hoof to the outer surface thereof.

Another object is the provision of improved means for mounting a shot plate to the bottom of a horse's hoof.

Another object is the provision of means for quickly and readily attaching and detaching a shoe to a horse's hoof without nails or other means extending through the hoof wall.

Another object is the provision for adjusting the means for securing a shoe to a horse's hoof to conform to the contour of the hoof, but without nailing the shoe to the hoof.

Another object is the provision of a shoe mounted to a horse's hoof in a manner to avoid pain to the horse otherwise caused by use of nails, and to avoid cracking and mutilating the wall of the hoof as otherwise occurring through frequent nailing of shoes to a hoof.

By "horse" as used herein is meant animals of the equine and related families, such as horses, ponies, donkeys, mules and the similar animals, having uncloven hoofs of horn. Hoofs of such animals have a curved wall of horn which slopes downwardly and outwardly so that the hoof is larger at the bottom than upwardly therefrom. The wall of horn at the bottom portion extends in a roughly crescent shape from the forward portion or toe of the hoof to two spaced buttresses at the heel or rearward portion of the hoof. The hoof has its broadest dimension at the bottom of the wall of horn taken between the wall sides intermediate of the toe and the buttresses or heel. Intermediate of the two buttresses is the frog of the animal's foot. Radially inwardly of the crescent-shaped wall of horn, and upwardly from the bottom of the wall, is the sole of softer material containing nerves. It is the horny wall which substantially supports the foot and under which a correspondingly contoured crescent-shaped shoe plate of iron, aluminum or other appropriate material is positioned.

It has been the usual prior practice to nail the shoe to the hoof by means of nails which extend upwardly through holes in the plate of the shoe and penetrate the horn of the hoof to the outwardly diverging sloping surface of the hoof wall where the ends or points of the nails are cut, twisted, clinched and bent over or otherwise upset so as to resist withdrawal of the nail from the hoof and hence to resist the separation of the shoe from the hoof. The holding of the shoe to the hoof under such usual prior practice was entirely dependent upon the holding power of a plurality of nails in the horn of the hoof. A force tending to pull the shoe directly away from the hoof was opposed by the friction and resistance offered by the nail in the horn and the clinched or bent-over end of the nail. This sometimes was insufficient to prevent separation of the shoe from the hoof, as for example, in mud which tends to pull the shoe from the hoof.

The use of nails to secure shoes to hooves has created many other problems known to those familiar with horses and the problem of keeping them properly shod and at the same time with keeping the horse's hooves sound and healthy. For example, to pound nails upwardly through the shoes into the horn without penetrating or injuring the inner soft material containing the sensitive nerves is a well-known difficult problem. Also the difficulty of repeatedly using nails for sequentially securing shoes to the hooves and hence causing many additional nail holes to be repeatedly formed in the horn and hence to split or weaken the horn is a well-known problem. These and other difficulties and shortcomings of the prior practice of using nails to secure shoes to horses' hooves have long been recognized but without adequate solutions or complete answers.

It is an object of my invention to provide a practical, efficient and economical solution to the above described problems and difficulties.

Other objects and a fuller understanding of the invention may be had by referring to the following description and claims, taken in conjunction with the accompanying drawings, in which:

Figure 1:
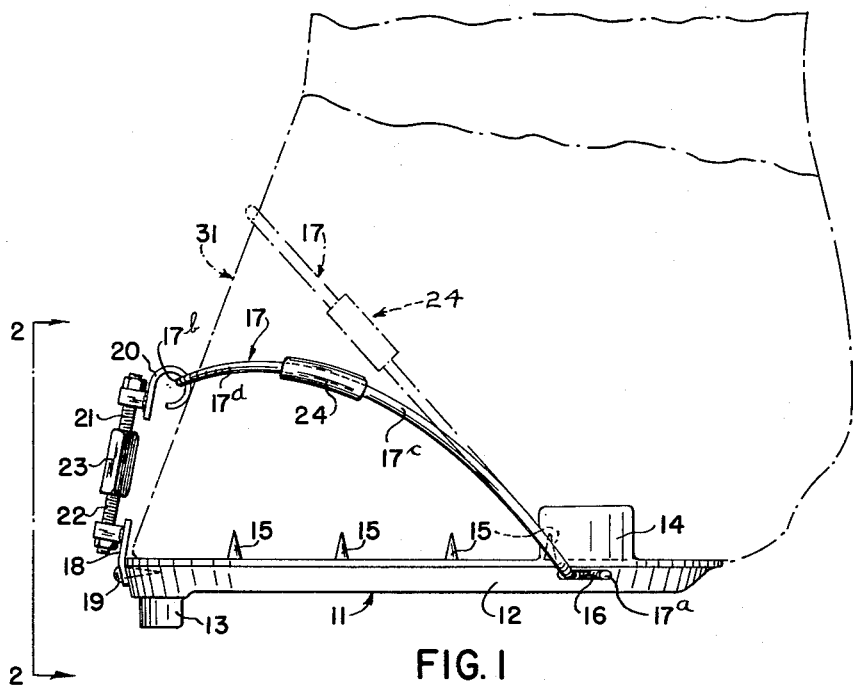
FIGURE 1 is a side view of a preferred form of my improved horse shoe shown mounted to a horse's hoof, depicted in broken lines.

The base plate 12 of my improved shoe, denoted generally by the reference character 11, is crescent-shaped or "horse-shoe shaped" to conform to the shape of the bottom of the wall of the horse's hoof, indicated in broken lines in FIGURE 1 and denoted generally by the reference character 31. The plate 12 has a toe caulk 13 extending downwardly from the forward portion of the plate, which forward portion is adapted to be positioned directly under the toe of the hoof 31. Two spaced rearward portions of the plate 12 are adapted to be positioned under the buttresses of the hoof 31, that is, under the heel of the hoof.

Extending upwardly from the upper surface of the plate 12 are a plurality of points 15 spaced therearound as shown. These points are preferably made integral with the plate 12 and are relatively short. They are long enough to extend only a very short distance into the wall of the hoof from the bottom thereof but are short enough that they do not penetrate through the wall of the hoof to the outer sloping surface thereof. The purpose of the points is to resist lateral movement of the plate relative to the bottom of the hoof, that is, movement of the plate in a plane parallel to the plane of the bottom of the hoof. The points 15 thus provide frictional resistance to lateral movement of the plate and particularly to forward relative movement of the plate relative to the hoof whereby the hoof could slip rearwardly from off the plate.

Disposed on opposite sides of the plate 12 adjacent the spaced rearward portions thereof and extending upwardly from the outer edges of the plate are two flanges 14. These flanges 14 extend up a short distance along the outer surface of the hoof near, but somewhat forwardly of, the heel or buttresses of the hoof. These flanges aid in preventing lateral movement of the plate relative to the bottom of the hoof, particularly in a sideward direction. The flanges 14 by embracing the sides of the hoof at the locations illustrated assist in maintaining the position of the hoof over the plate.

Figure 9:
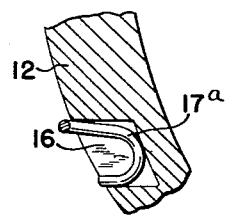
FIGURE 9 is enlarged sectional view showing detail adjacent a rearward end portion of the horse shoe, showing detail there of the mechanism for holding the shoe to the hoof.

To hold the plate 12 against withdrawal from the hoof there is provided an elongated holding member 17. This member 17 is spring wire, rod or the like and resiliently bends from a normal fixed configuration in which set. The member 17 is formed of wire or the like in a loop of general U-shape and is set or biased in this general U-shape and spring-tempered in that form. The two opposite ends 17a are bent in flat hook form in the same plane as seen in FIGURES 1 and 9 to complementarily fit in narrow rectangular slots 16 formed in the plate 12 under the respective flanges 14. By reason of the snug interfit of ends 17a in the respective slots 16, the member 17 is non-rotatively secured to the plate 12 adjacent the spaced rearward portions of the shoe. The spring bias of the member 17 is such that in an unrestrained and unflexed condition, it tends to assume the shape shown in broken lines in FIGURE 1, that is, the member is spring-biased to the simple U-shape illustrated in broken lines in FIGURE 1.

The bight portion 17b of member 17 is positioned so as to be over the toe of a hoof 31 disposed on the plate 12. This bight portion 17b is substantially equidistant from the end portions 17a. Upon forcing the bight portion 17b downwardly from the position shown in broken lines shown in FIGURE 1 to the position shown in full lines in FIGURE 1, the holding member 17 is resiliently flexed to arch over and embrace the diverging sloping outer surface of the hoof wall. At a location intermediate of the rearward curved portion 17c and the forward curved portion 17d, on opposite sides of the hoof, the holding member opposes and is restrained against farther downward movement by the outwardly diverging wall surface, as the wall surface extends downwardly and outwardly toward the bottom of the hoof wall.

I mount on the holding member pads 24 and 25 of rubber of rubber-like material, one pad being disposed on each side of the bight portion 17b. The pads embrace and may slide along the holding member 17 so that their respective positions may be adjusted. Each pad is positioned along the holding member 17 so as to engage the sloping surface of the hoof wall where the member 17 encounters and is opposed by the sloping surface. The holding member 17 flexes in a gradual curve downwardly and forwardly from the location of a pad 24 or 25 engaging the hoof wall surface to form curved forward portions 17d. The holding member 17 flexes in a gradual curve downwardly and rearwardly from the location of a pad 24 or 25 engaging the hoof wall surface to form curved rearward portions 17c.

Figure 2:
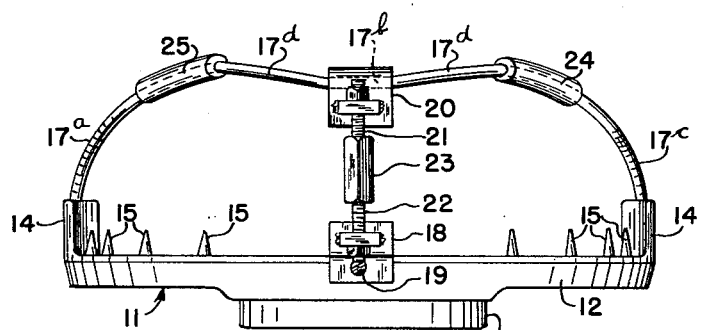
FIGURE 2 is a front view of my improved horse shoe, now showing the hoof, looking in the direction of the arrows 2—2 of FIGURE 1.
Figure 6:
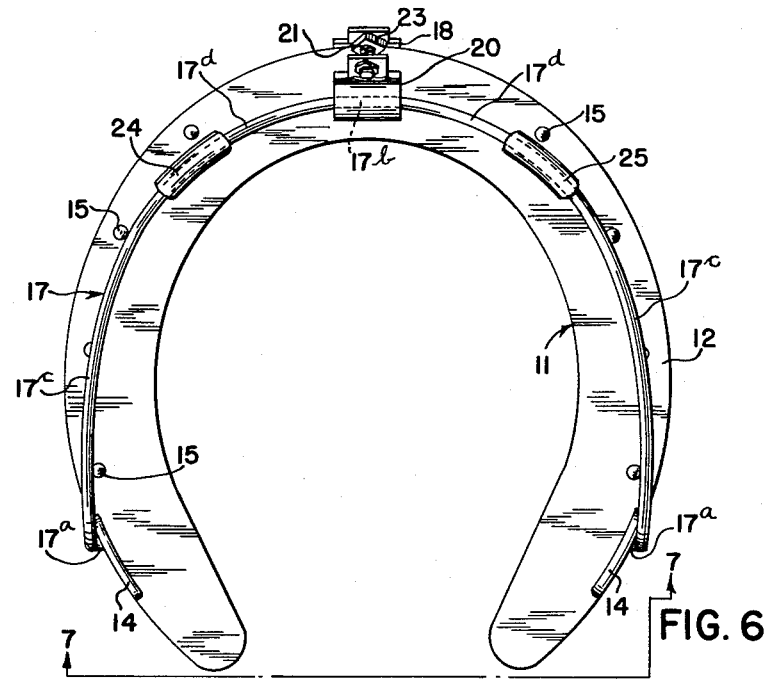
FIGURE 6 is a plan view of my improved horse shoe, not showing the hoof.
Figure 7:
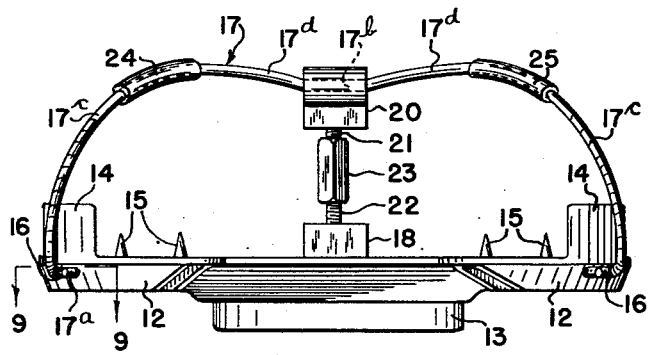
FIGURE 7 is a rear view of my improved horse shoe, not showing the hoof, and looking in the direction of the arrows 7—7 of FIGURE 6.
Figure 8:
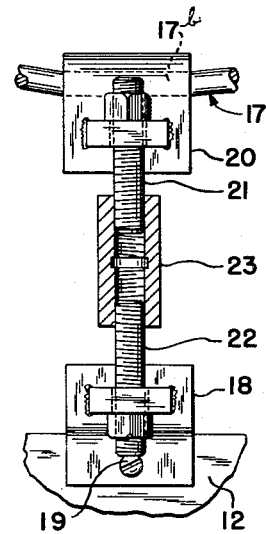
FIGURE 8 is an enlarged view partially in section of the portion of my improved horse shoe at the forward portion thereof, showing detail of the mechanism for holding the shoe to the hoof.

The pads 24 and 25 in effect form fulcrums or bearing points upon which the holding member 17 on opposite sides of the hoof press downwardly on the diverging sloping wall surfaces of the hoof. The bight portion 17b and end portions 17a are resiliently urged upwardly relative to the location of pads 24 and 25 by reason of the spring bias of holding member 17 when flexed in the position of full lines of FIGURE 1 and as illustrated in FIGURES 2, 6 and 7.

To restrain and maintain the holding member 17 in its resiliently flexed position, there is provided a connecting member at the forward end portion of the shoe plate and over the hoof toe. In the form of the invention illustrated in FIGURES 1, 2, 6, 7, 8 and 9, this connecting member is comprised of aligned screw bolts 21 and 22 interthreadably connected by a long threaded nut 23 in such a manner that by turning the nut 23 in one direction the effective length of the assembly of nut 23 and bolts 21 and 22 is increased, and in an opposite direction is decreased. A hooked catch or engaging portion 20 is carried by the upper end of bolt 21 in a manner that provides for the elevation of engaging portion 20 relative to the plate 12 to be adjustably varied by turning the nut 23. A bracket member 18 secured to the front end of plate 12 by a screw 19 anchors the bolt 22 to the plate 12. The bolt 22 is non-rotatively secured to the bracket 18 and bolt 21 is non-rotatively secured to engaging portion 20, and the threading of bolts 21 and 22 in nut 23 causes engaging portion 20 to be raised or lowered by turning of nut 23. Thus, the effective length of the connecting member is adjustably determined.

By reason of the variations in the size and contour in horses' hooves, it is provided that the length of the holding member 17 and the effective length of the connecting member anchoring the bight portion 17b are such that the holding member snugly engages and embraces the sloping side wall surfaces of a hoof whereby the pads 24 and 25 are firmly pressed downwardly on the opposing diverging wall surfaces. Within limits this adjustment may be made by sliding the pads along the holding member 17 to where the balance appears best, and also by adjusting the effective length of the connecting member to assure that the bight portion 17b is held down snugly over the toe and firmly embraces the hoof wall surface over the toe. In other cases, as for a larger sized hoof, it may be necessary to use a longer holding member 17.

Figure 3:
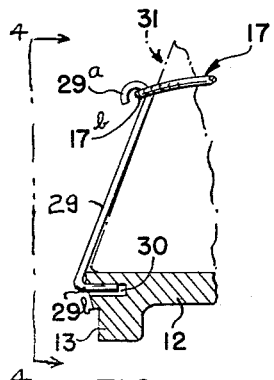
FIGURE 3 is a view partially in section showing a modified arrangement at the forward end of my improved horse shoe, showing detail of this modified mechanism.
Figure 4:
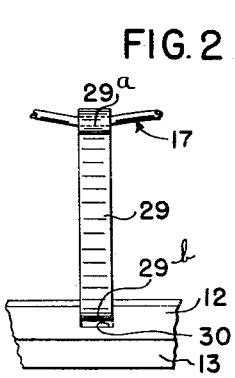
FIGURE 4 is a front view of the modified arrangement shown in FIGURE 3, looking in the direction of the arrows 4—4 of FIGURE 3.

A modified and simple form of connecting member for restraining the bight portion 17b in a downward position is illustrated in FIGURES 3 and 4. Here, the connecting member denoted by the reference character 29 is a metal strap having a lower bent end 29b which complementarily enages in a rectangular opening 30 formed in the forward portion of plate 12 as shown. The upper end of member 29 is bent over to form the hook portion 29a as shown, the end portion 29b being bent in one direction and end portion 29a being bent in an opposite direction. To obtain variation in the spacing of the bight portion 17b above the plate 12, with connecting members such as 29, different length connecting members are utilized. The bight portion 17b is readily hooked under the hook portion 29a by bending the holding member 17 sufficiently downwardly past the entrance or opening of the hook portion to clear the same and then releasing the holding member 17 whereby under its resilient action, it flexes upwardly to where the bight portions is engaged under the hook portion 29a as shown in FIGURES 3 and 4.

Figure 5:
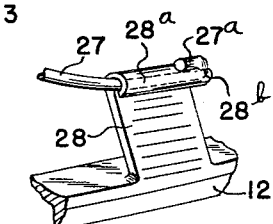
FIGURE 5 is a view showing detail adjacent a rearward end portion of the shoe illustrating a modified arrangement of the mechanism at that location.

In FIGURE 5, there is illustrated a modified arrangement for anchoring the rear end portion of the holding member to the plate. In this modified form, the flanges 14 have substituted therefor the two flanges 28, one on each side of the shoe. The flange 28 has an outwardly curled-over portion 28a and at the rearward portion of this portion 28a, there is provided a slot 28b. A holding member 27, which is similar to holding member 17 except for the rear end portions thereof, has bent-over end portions 27a. The holding member is tightly embraced in curled-over portions 28a and the bent-over end portions 27a extend through the slots 28b and over the top of the curled-over portions 28a, respectively. In this manner, the ends of the holding member 27 are non-rotatively anchored to the flanges 28 on the plate 12.

It is thus seen by the use of my invention, a shoe plate is resiliently clamped or held to a hoof by an ingenious mechanism particularly fitted and designed to the peculiarities and features of a horse's hoof, and in a manner to avoid hurting the horse or injuring the hoof in any manner.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A shoe for a horse's hoof having a curved bottom wall extending from the toe to spaced buttresses and having side walls sloping downwardly and outwardly to said bottom wall, the included angle between said bottom wall and said side walls at the toe and adjacent thereto being less than a right angle, the broadest dimension of the bottom wall being intermediate said toe and buttresses, said shoe comprising a curved base plate adapted to be positioned under said curved bottom wall to support the hoof, said base plate having a forward portion to be positioned below the toe of the hoof and spaced rearward portions to be positioned below the buttresses, respectively, of the hoof, a resiliently yieldable curved spring-wire loop having rearward end portions, a bight portion bowed out therefrom and curved side portions extending from said bight portion to said end portions, said spring-wire loop being resiliently biased to assume a substantially U-shape and in the general plane of said U upon said rearward end portions of the loop being positioned at said rearward portions of the base plate, anchoring means anchoring said end portions of the spring-wire loop to said base plate adjacent said rearward portions thereof, respectively, a connecting member secured to said base plate adjacent said forward portion and extending upwardly therefrom, said connecting member having an engaging portion positioned upwardly of and at a distance from said forward portion of the base plate, said engaging portion being adapted to interengage with and to hold said bight portion of the spring-wire loop upon said spring-wire loop being resiliently flexed downwardly from said plane to engage said engaging portion, each of said curved side portions having a bearing portion intermediate its ends, each said bearing portion being adapted to engage the said sloping side wall of a hoof embraced by said spring-wire loop upon said bight portion and said end portion being flexed downwardly from the general plane of said U to engage said connecting member and anchoring means, respectively, the crown of the sloping side wall engaged by said bearing portion providing a fulcrum for the respective side portion upon which the flexed curved side portion is supported in opposition to said bias, said resiliently flexed loop holding said base plate to said hoof by the spring action thereof recoiling toward said plane urging upwardly the end portions and the bight portion thereof upon said bearing portions of the curved side portions of the loop engaging and being opposed by the said fulcrums.

2. A shoe as claimed in claim 1 in which each said bearing portion includes a pad adjustably movable along the respective curved side portion to a position to provide a bearing point for the curved side portion on the sloping side wall of the hoof over which the curved side portion is positioned.

3. A shoe as claimed in claim 1 and including means for adjustably changing the effective length of said connecting member for accommodation of variation in the size and shape of the hooves to which the shoe is to be mounted.

4. A shoe as claimed in claim 1 and in which the anchoring means for said end portions includes a hook portion on the ends of the curved side portions and slots in the base plate accommodating said hook portions to anchor the same to the base plate.

5. A shoe for a horse's hoof comprising the combination of a base plate adapted to engage and support the base of the hoof, a resiliently yieldable loop member of relatively non-elongatable spring material formed in a U-shape and biased to assume a relatively flat plane of the said U upon the ends of the loop member being secured to spaced rearward portions of the base plate, anchoring means anchoring the opposite ends of the loop member to the said rearward portions of the base plate, and securing means for securing the bight of the loop member to the forward portion of said base plate to flex the loop over the sloping side wall of the hoof on opposite sides thereof, said loop member being dimensioned to engage the sloping side above the base of the hoof at locations intermediate the bight and the ends of the loop member, the engaged side wall at said locations providing fulcrum support for the loop member, the resiliency of the loop member biased toward said flat plane and the fulcrum support at said locations urging the said base plate at said forward portion and said spaced rearward portions thereof against the base of said hoof.

6. A shoe as claimed in claim 5 and including pads adjustably movable along said loop member to engage said side wall at said locations, respectively, for accommodation to variation in shape of hooves.

7. A shoe as claimed in claim 6 and in which said securing means includes adjustable means for adjustably varying the spacing of the bight of the loop member from the forward portion of the said base plate by said securing means.

8. A shoe as claimed in claim 6 and in which said anchoring means includes slots in the base plate at said rearward portions and engaging portions on the opposite ends of the loop member engaging in said slots.

References Cited in the file of this patent

UNITED STATES PATENTS

| 178,871 | Murraine | June 20, 1876 |
| 200,180 | Darling | Feb. 12, 1878 |
| 459,394 | Covell | Sept. 15, 1891 |
| 549,536 | Roche | Nov. 12, 1895 |
| 810,849 | Egger | Jan. 23, 1906 |

FOREIGN PATENTS

| 27,057 | Great Britain | Nov. 28, 1896 |
| 27,817 | Great Britain | Dec. 7, 1896 |
| 44,296 | Switzerland | July 30, 1908 |